United States Patent [19]

Lamarche

[11] Patent Number: 4,989,816
[45] Date of Patent: Feb. 5, 1991

[54] UNIVERSAL CARRIER BRACKET

[76] Inventor: Joseph R. Lamarche, 7 Kingsview Ct., Oshawa, Ontario, Canada, L1H 7K3

[21] Appl. No.: 381,850

[22] Filed: Jul. 19, 1989

[30] Foreign Application Priority Data

Jul. 28, 1988 [CA] Canada .................... 573246

[51] Int. Cl.⁵ .......................................... A47B 96/06
[52] U.S. Cl. ............................ 248/231.6; 248/288.3; 248/516
[58] Field of Search ............... 248/231.6, 481, 181, 248/288.3, 288.5, 96, 516; 224/274; 280/655, 274, 47.18, DIG. 6, 47.26

[56] References Cited

U.S. PATENT DOCUMENTS

| | | |
|---|---|---|
| 153,813 | 8/1874 | Dewey .................... 248/516 X |
| 358,497 | 3/1887 | Stevens .................... 248/516 |
| 424,572 | 4/1890 | Painter . |
| 438,238 | 10/1890 | Jefferies et al. . |
| 1,775,525 | 9/1930 | Hedlund ............. 248/288.3 X |
| 2,711,872 | 6/1955 | Lampke . |
| 2,822,143 | 2/1958 | Johansen .................... 248/516 |
| 2,950,836 | 8/1960 | Murdock . |
| 3,148,851 | 9/1964 | Condon . |
| 3,413,012 | 11/1968 | Coffman .................... 224/274 X |
| 3,735,997 | 5/1973 | Seibold ............. 280/DIG. 6 X |
| 4,262,928 | 4/1981 | Leitzel ............. 280/DIG. 6 X |
| 4,657,100 | 4/1987 | Lewis .................... 224/274 X |
| 4,889,267 | 12/1989 | Bolton .................... 224/274 |

Primary Examiner—J. Franklin Foss
Attorney, Agent, or Firm—Stevens, Davis, Miller & Mosher

[57] ABSTRACT

The structure is disclosed of one of two socket members for receiving downwardly directed pins integral with a rectangular rack, to attach the rack to a golf cart or the like. The socket member has multi-directional adjustability so that it can be secured to a suitable part of the frame of the cart and adjusted to fit exactly the given spacing between the two pins of the rack. The advance in the art is in that a single type of the rack can be used with many kinds of a golf cart or the like.

6 Claims, 2 Drawing Sheets

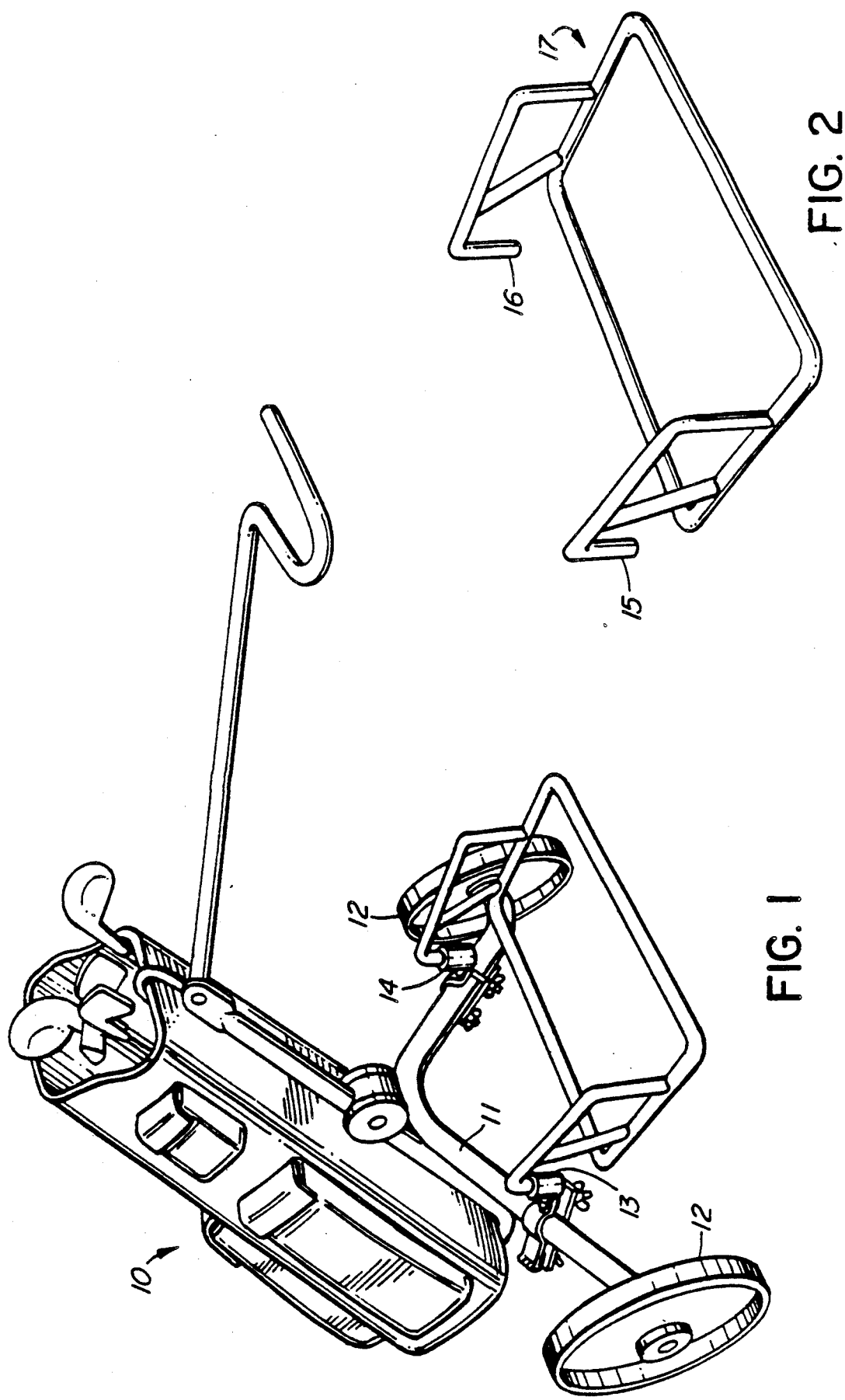

UNIVERSAL CARRIER BRACKET

The present invention relates to the art of load carriers and in particular to the art of the racks of the type disclosed in my co-pending Canadian patent application Ser. No. 530,153, filed Oct. 8, 1986.

In my co-pending Canadian patent application referred to above, I have disclosed a load carrier which is useful in combination with hand carts and in particular with a golf cart, as the load carrier can be easily attached to or detached from a golf cart.

In general terms, my design of the load carrier includes the usual frame section for supporting articles such as a cooler. The frame section is integral with two spaced apart, normally generally downwardly directed, parallel pins. In the arrangement shown in my co-pending patent application, the pins are adapted to fit in bores provided in a part of the frame of a golf cart.

The arrangement is useful in that it allows an extremely simple attachment or detachment of the load carrier to or from a hand cart such as a golf cart.

On the other hand, considering the number of different kinds of golf carts, my rack could not be used with some of the frame sections of the existing golf carts as many frames are not suited for drilling holes therein or otherwise modifying the frame to provide the sockets.

It is therefore an object of the present invention to provide an arrangement which would allow convenient securement of the carrier to golf carts or the like having frame sections of many different shapes and cross sectional configurations.

In general terms, the present invention provides a socket member for removably attaching a load carrier to the frame of a hand cart. The carrier has a rigid structure including a load supporting section and a pair of normally downwardly directed pins integral with the load supporting section and adapted to be each received in one socket member on the frame of the cart. The socket member includes a hollow cylindric base and a pair of annular flange members disposed one at each end of the base. The annular flange members clamp therebetween and within the base a generally spherical member in which is provided an opening complementary with the respective one of said pins for inserting of the pin therein. The base and the annular flange members are co-axial with each other. The base is provided with securement for securing the base to a support at a position of the base relative to the support, which is adjustable along and about a second axis transverse to the axis of the base. The socket member further includes clamp means operatively associated with said support to fixedly secure the socket member to an appropriate section of the frame of the hand cart.

The invention will now be described by way of an exemplary embodiment with reference to the accompanying drawings wherein:

FIG. 1 is a diagrammatic representation of a golf cart showing the arrangement of the present invention in a perspective view;

FIG. 2 is a perspective view showing in greater detail, the overall arrangement of the load supporting carrier of my co-pending Canadian patent application;

Figure 3:
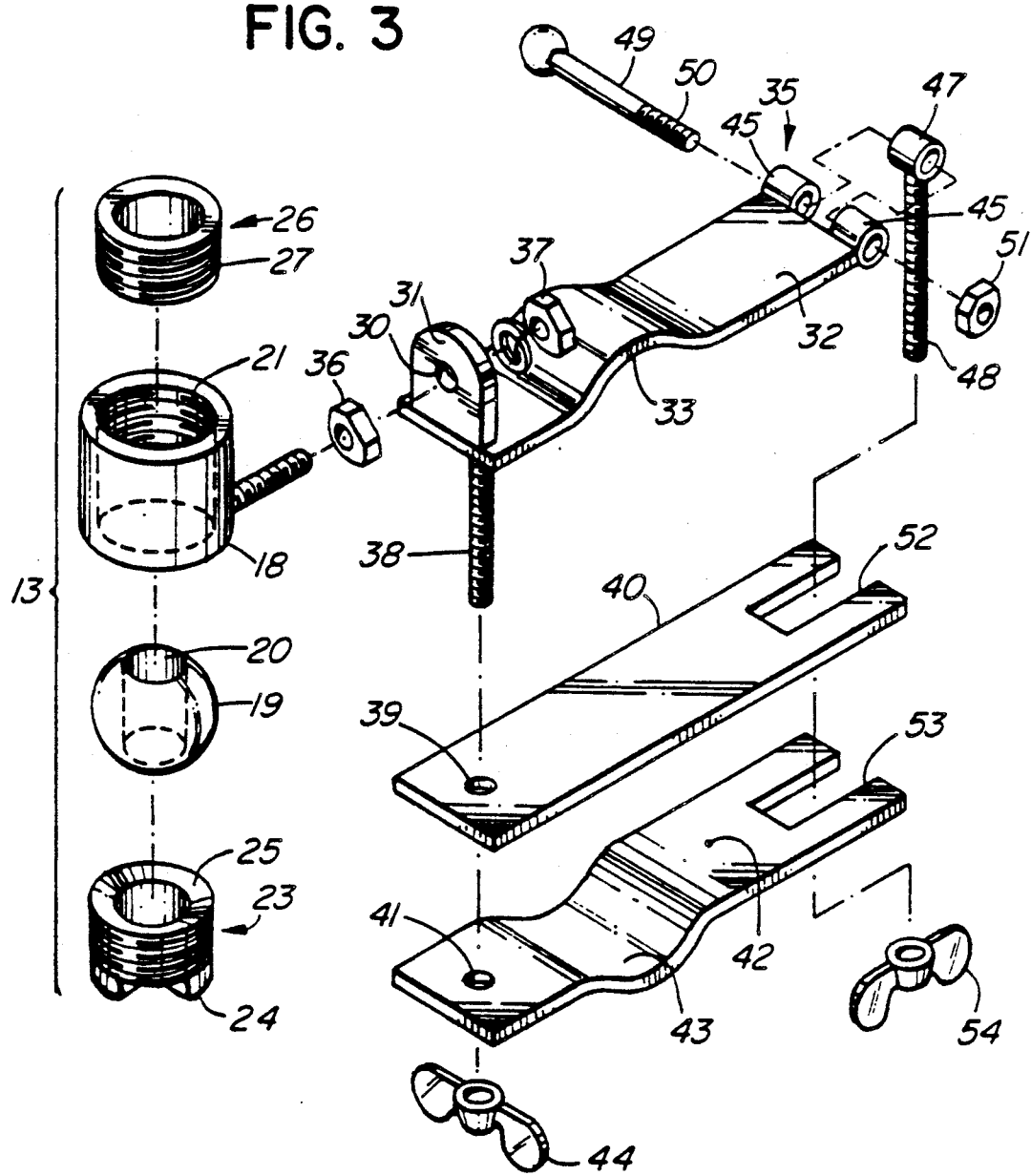
FIG. 3 is an exploded view of one socket member according to the present invention.

Turning firstly to FIGS. 1 and 2, reference numeral 10 designates a golf cart which includes an arcuately shaped frame section 11 at each end of which is secured a wheel 12. Approximately mid-way between the centre of the frame section 11 and each of the wheels 12, there is provided a socket member 13, 14 which is complementary with downwardly directed pins 15, 16 of a rigid, welded load supporting frame of a rectangular rack 17. The pins 15, 16, are compatible with openings in the socket members 13, 14 to provide a convenient attachment of the rack 17 to the frame section 11 or a quick and easy detachment of the rack 17 from same without the need for any tools, simply by inserting or withdrawing the pins 15, 16 into or out of sockets 13, 14.

The arrangement presents a further improvement of my original system described in the above Canadian Patent application. The original system works satisfactorily with some carts but is difficult to use with in other kinds of golf carts which have the respective frame sections of a dimension or shape unsuitable for the drilling of passages for the pins 15, 16.

FIG. 3 shows the socket member 13 of the present invention in an exploded view. It includes a base 18 of the type of a sleeve which, in the shown embodiment, is provided with a pair of annular flange members or retainers, later described in greater detail. The annular flange members are adapted to clamp therebetween and within the sleeve 18 a spherical member 19 provided with an opening 20 complementary with the pin 15, to allow its free inserting or withdrawal. The other one of the pins 15, 16, of course, co-operates with the other socket member 14 of a similar structure.

In the shown embodiment, the base 18 is made of steel and is provided with an inner thread 21 extending throughout the entire length of the sleeve 18. The thread 21 of the sleeve 18 is complementary with the outer thread 22 of a lower annular flange member 23 forming a bottom retainer. At the lower face of the retainer 23, two opposed bosses 24 are provided for engagement with a suitable tool.

The top face of the bottom retainer 23 is scarfed at 25 to provide a concavely shaped segment of a spherical surface which has the same radius as the radius of the spherical member 19.

Another annular flange member, the top retainer 26, is provided with an outer thread 27 complementary with the inner thread 21 of the base sleeve 18.

The arrangement as described allows hand threading of the top retainer 26 into the sleeve 18. Then, the spherical member 19 is placed inside the sleeve 18 and secured in the sleeve 18 by the bottom retainer 23 threading and tightening the latter in the sleeve 18. Upon tightening of the retainer 23, the sphere 19 is clamped firmly within the sleeve 18.

A threaded stem 28 protrudes radially outwardly from the sleeve 18. It is of a diameter small enough to pass through a passage 30 in a boss 31 welded to the top surface of a support 32.

A concavely curved depression 33 of the support 32 is provided between a first end 34 of the support, and a second end 35 of the support 32. The depression 33 extends transversely of the support 32.

A pair of lock nuts 36, 37 is used in fixedly securing the stem 28 (and thus the sleeve 18) to the boss 30 and thus to the support 32, and to lock it in a suitable position along the axis of the threaded stem 28.

The support 32 has welded to it a downwardly directed threaded stem 38 adapted to pass through an opening 39 in an intermediate plate 40 and through a hole 41 in a bottom plate 42. The bottom plate 42 forms a second depression 43 which forms a complement of the depression 33.

A wing nut 44 has an internal thread complementary with the thread of the threaded stem 38.

The second end 35 of the support 32 forms a pair of ooaxial hinge sleeves 45, 46 spaced apart a distance sufficient to receive therebetween a bearing sleeve 47 which is integral with a threaded stem 48. When the sleeve 47 is placed between the hinge sleeves 45 and 46 in a coaxial arrangement, a hinge bolt 49 can be inserted into the sleeves 45-47 such that its threaded end 50 protrudes beyond the face of the sleeve 46, to receive a retainer nut 51. The stem 48 thus hinged to the support 32 can be placed in a rectangular cutout 52 of the plate 40 and in a rectangular cutout 53 provided in the bottom plate 42. A second wing nut 54 is compatible with the thread of the stem 48.

In use, and assuming that the pair of the socket members 13, 14 of the present invention is to be secured to the frame of the golf cart as shown in FIG. 1, the support 32 is first preliminarily secured to the frame section 11. The securement is effected by the two wing nuts 44, 54 pressing against the lower surface of the bottom plate 42. Since the frame section 11 is of a half moon-shaped cross sectional configuration, the intermediate plate 40 is utilized as one of the two clamping members, the other clamping member being the support 32. If the cross section of the frame member 11 were circular, rectangular, hexagonal or the like, the intermediate plate would not be necessary and only the support 32 and the bottom plate 42 would be used.

It can be readily appreciated that if the arrangement of a similar cross sectional configuration was turned 180°, then the clamping would take place between the bottom plate 42 and the intermediate plate 40.

Thus, by providing a simple, flat intermediate plate 40, the universality of the clamping of the support 32 to the frame member of a golf cart or the like is substantially increased. I have found out that most of golf cart frames, (to which the present invention is primarily related), have a circular, half moon or square cross sectional configuration. The present invention as shown in FIG. 3 is adapted to accommodate any of those three and other cross sectional configurations (for instance a hexagon).

When the support 32 is preliminarily secured to the frame, the sleeve 18 with the spherical member 19 located inside but not tightly clamped yet, is secured to the support 32 by passing the threaded stem 28 through the boss 31 on the base 32. The looking nuts 36, 37 are threaded on the stem 28, one to each side of the boss but are not firmly tightened yet. The socket member is now loosely secured to a part of the frame of the golf cart.

The second socket member 14 adapted to accommodate the second plug 16 of the rack 17 is then preliminarily secured to its corresponding portion of the frame section 11 of the cart. The adjustment of the distance between the axes of the openings 20 of the spheres 19 can be made by shifting the support 32 along the frame section 11, and/or by displacing the sleeve 18 with the sphere 19 therein along the axis of the stem 28 upon appropriate manipulation of the locking nuts 36, 37. When this adjustment is finished, the wing nuts 44, 54 and the locking nuts 36, 37 are tightened.

With the spacing between the openings so adjusted, the pins 15, 16 of the rack 17 can now be inserted into the respective openings 20 of the spheres 19 and upon reaching an appropriate arrangement of the rack 17, the lower retainers 23 are tightened to firmly secure each sphere 19 to the respective base sleeve 18 of the socket member.

It will be appreciated that the shown embodiment of present invention also allows for a selective displacement of the spherical member 19 along the axis of the sleeve 18, depending upon the particular mutual position of the two retainers 23, 26. This possibility, together with the freedom of tilting the openings 20 before tightening the retainers 23, enables a convenient adjustment of the level of the rack both in transverse and in longitudinal direction.

The above description presents a prototype of what is presently a preferred embodiment of the invention. Many other embodiments of the present invention may depart to a greater or a lesser degree from the embodiment disclosed, without departing from the scope of the present invention as recited in the accompanying drawings.

Accordingly, I wish to secure by the Letters Patent which may issue on the present application all such embodiments as properly and reasonably fall within the scope of my contribution to the art.

I claim:

1. A socket member for removably attaching a carrier to the frame of a hand cart, which carrier has a rigid structure including a load supporting section and a pair of normally downwardly directed pins adapted to be slidably inserted one in each of two sockets provided on the frame of a cart, said socket member including:

(a) a hollow cylindric base and a pair of annular flange members disposed one at each end of the base, said annular flange members clamping therebetween and within the base, a generally spherical member provided with an opening complementary with an associated carrier to allow a sliding inserting therein or withdrawal therefrom of a respective one of said pins;

(b) the base being provided with mounting means for mounting the base to a support at a position which is adjustable by selectively turning the base about a second axis transverse to the axis of the sleeve, and/or by selectively displacing same along said second axis;

(c) clamp means operatively associated with the support to fixedly secure the support and thus the socket member to a part frame section of the respective hand cart.

2. A socket member as claimed in claim 1, wherein the base is provided with an inner thread and wherein at least one of said flange members is an annular member having an outer thread complementary with the inner thread of the base, said one of said flange members further including tool engagement means to facilitate the tightening thereof within the base to fixedly clamp said spherical member within the sleeve.

3. A socket member as claimed in claim 2, wherein said base is a sleeve provided with an inner thread at each end thereof and wherein each of said flange members is an annular member having an outer thread complementary with the inner thread of the sleeve, whereby the spherical member can be clamped within the sleeve at a position selectively adjustable along the axis of the sleeve.

4. A socket member as claimed in claim 1, wherein said securement means is a threaded rod fixedly secured to the base and projecting therefrom in a direction transverse to the direction of the axis of the sleeve the socket member further comprising a boss generally integral with said support and defining a passage for the threaded rod, and a pair of locking nuts compatible with the threaded rod and adapted to engage opposite faces of the boss to fix the threaded rod relative to the boss to thus secure the sleeve to the support at a selected position.

5. A socket member as claimed in claim 1, wherein said clamp means includes a pair of clamping members, each provided with a depression complementary with a similar depression in the other plate for clampingly receiving a cart frame section therebetween, a flat intermediate plate adapted to be placed between the clamping members to subdivide the space between the depression into two generally identical portions, said clamp means further including pressure applying means adapted to urge the clamping members to each other to clamp therebetween a section of the frame of a respective cart.

6. In combination, a load carrier including a load supporting section and a pair of spaced apart, normally downwardly directed pins integral with the load supporting section, the pins being each loosely inserted in a respective socket member, each socket member comprising:
 (a) a hollow cylindric base and a pair of annular flange members disposed one at each end of the base, said annular flange members clamping therebetween and within the base, a generally spherical member provided with an opening complementary with an associated carrier to allow a sliding inserting therein or withdrawal therefrom of a respective one of said pins;
 (b) the base being provided with mounting means for mounting the base to a support at a position which is adjustable by selectively turning the base about a second axis transverse to the axis of the sleeve, and/or by selectively displacing same along said second axis;
 (c) clamp means operatively associated with the support to fixedly secure the support and thus the socket member to a part frame section of the respective hand cart.

* * * * *

UNITED STATES PATENT AND TRADEMARK OFFICE
CERTIFICATE OF CORRECTION

PATENT NO. :  4,989,816

DATED      :  February 5, 1991

INVENTOR(S):  Joseph Regent LAMARCHE

Figure 4:
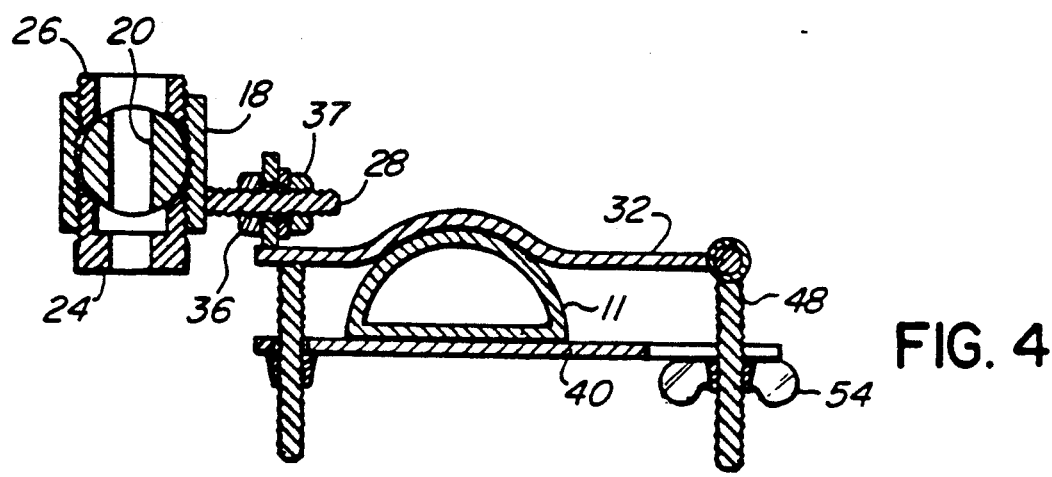
FIG. 4 shows an arrangement similar to that of FIG. 3 in an assembled state and secured to a section of the frame of a cart.
Figure 3:
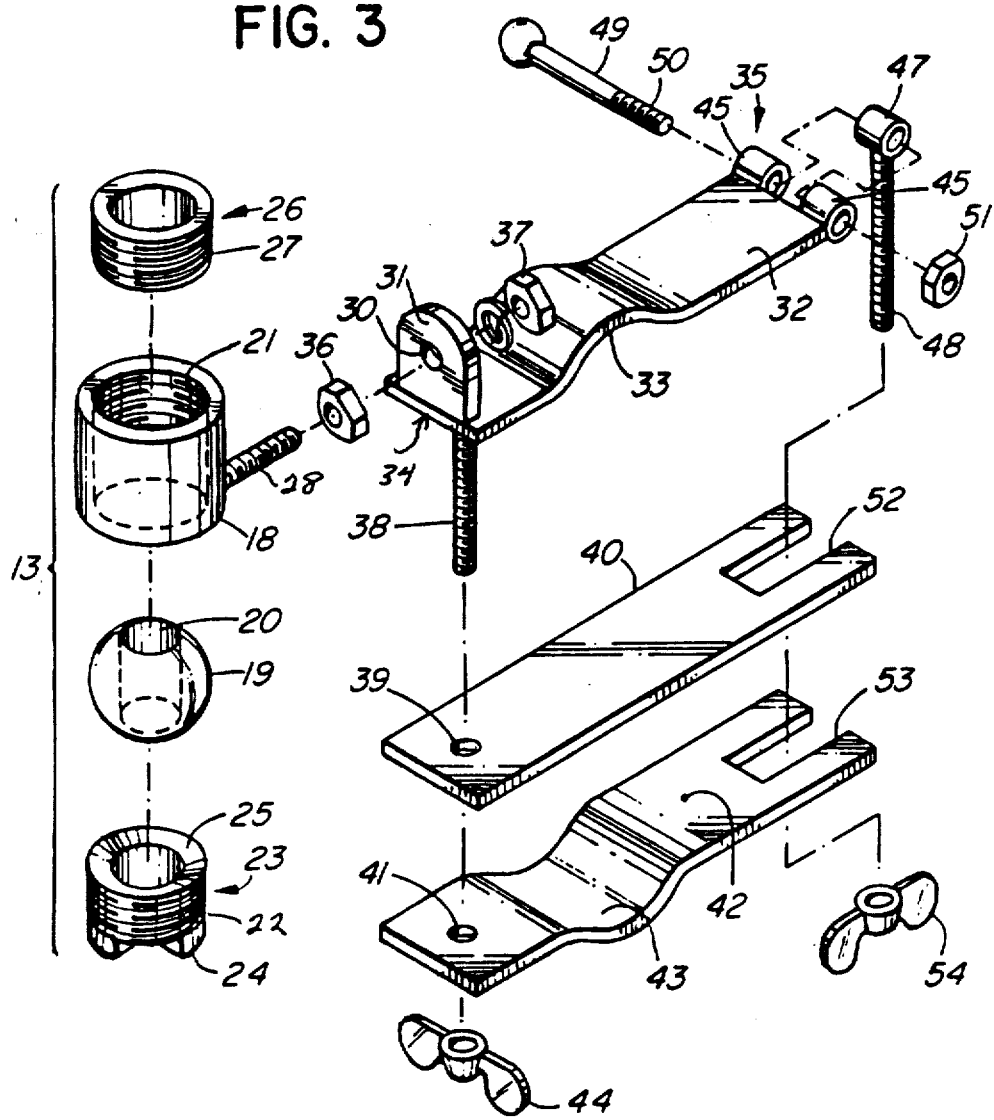
Figure 4:
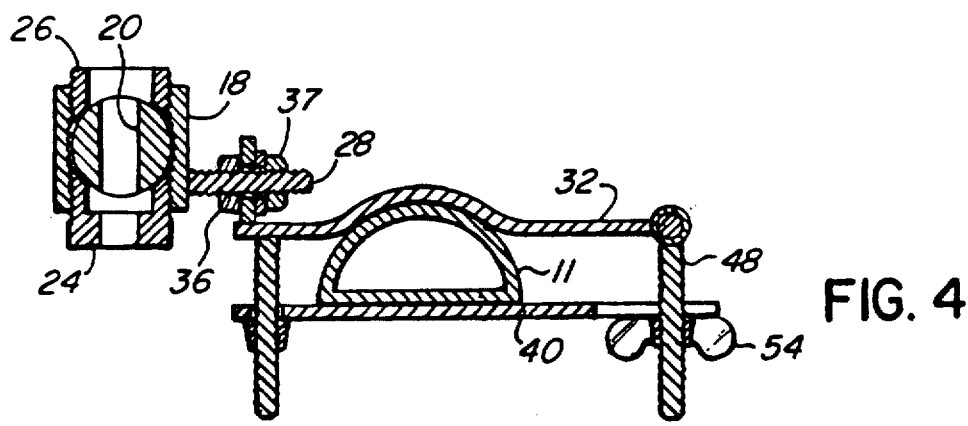

It is certified that error appears in the above-identified patent and that said Letters Patent is hereby corrected as shown below:

Sheet 2 of the drawings, consisting of Figs. 3 and 4, should be deleted to be replaced with the sheet of drawings, consisting of Figs. 3 and 4, as shown on the attached page.

Column 1, lines 6-7, "application Ser. No. 530,153, filed Oct. 8, 1986" should read -- number 1,265,483 --.

Column 4, Claim 1, line 44, "sleeve" should read -- cylindric base --.

Column 4, Claim 2, line 58, "sleeve" should read -- cylindric base --.

Column 4, Claim 4, line 68, "securement" should read -- mounting --.

Column 5, Claim 4, line 2, "sleeve" should read -- cylindric base --.

Column 6, Claim 6, line 16, "sleeve" should read -- cylindric base --.

Signed and Sealed this

Twenty-fourth Day of November, 1992

*Attest:*

DOUGLAS B. COMER

*Attesting Officer*     Acting Commissioner of Patents and Trademarks